US012598179B2

(12) United States Patent
Rosomakho

(10) Patent No.: US 12,598,179 B2
(45) Date of Patent: Apr. 7, 2026

(54) SYSTEMS AND METHODS FOR CLOUD-CENTRIC BIOMETRIC STEP-UP AND AUTHENTICATION

(71) Applicant: Zscaler, Inc., San Jose, CA (US)

(72) Inventor: Yaroslav Rosomakho, Thatcham (GB)

(73) Assignee: Zscaler, Inc., San Jose, CA (US)

( * ) Notice: Subject to any disclaimer, the term of this patent is extended or adjusted under 35 U.S.C. 154(b) by 79 days.

(21) Appl. No.: 18/440,002

(22) Filed: Feb. 13, 2024

(65) Prior Publication Data

US 2025/0260685 A1 Aug. 14, 2025

(51) Int. Cl.
*H04L 9/40* (2022.01)
*G06V 40/16* (2022.01)

(52) U.S. Cl.
CPC ........ *H04L 63/0861* (2013.01); *G06V 40/172* (2022.01); *H04L 63/0428* (2013.01)

(58) Field of Classification Search
CPC ............ H04L 63/0861; H04L 63/0428; G06V 40/172
USPC ....................................................... 713/186
See application file for complete search history.

(56) References Cited

U.S. PATENT DOCUMENTS

| | | | | |
|---|---|---|---|---|
| 10,742,647 B2 * | 8/2020 | Crabtree | ................. | H04L 43/04 |
| 11,153,303 B2 * | 10/2021 | Scruby | ................. | H04L 9/3234 |
| 2014/0075548 A1 * | 3/2014 | Sampathkumaran | ... | G06F 21/31 726/19 |
| 2014/0257833 A1 * | 9/2014 | Williams | ............... | G16H 40/40 705/2 |
| 2015/0341370 A1 * | 11/2015 | Khan | ....................... | H04L 63/20 726/30 |
| 2018/0330212 A1 * | 11/2018 | Kumar | .................. | H04L 9/3234 |
| 2019/0149539 A1 * | 5/2019 | Scruby | .................. | H04L 63/083 713/168 |
| 2020/0193156 A1 * | 6/2020 | Ralston | ................ | A61B 5/0022 |
| 2025/0039169 A1 * | 1/2025 | Lindemann | ............. | H04L 63/20 |

* cited by examiner

*Primary Examiner* — Dant B Shaifer Harriman
(74) *Attorney, Agent, or Firm* — Baratta Law PLLC; Lawrence A. Baratta, Jr.; Ryan Odessa

(57) ABSTRACT

Systems and methods for cloud-centric biometric step-up and authentication include monitoring traffic from one or more endpoints via a cloud service; determining a requirement for authentication of a user associated with the traffic based on the monitoring; causing a computing device associated with the user and the traffic to capture a photograph of the user; and processing the photograph to confirm an identity of the user. In various embodiments, the capturing of the photograph is performed by a computing device associated with the user, wherein the processing of the photograph is performed by the cloud service for identification of the user.

20 Claims, 6 Drawing Sheets

600

SYSTEMS AND METHODS FOR CLOUD-CENTRIC BIOMETRIC STEP-UP AND AUTHENTICATION

FIELD OF THE DISCLOSURE

The present disclosure generally relates to network and cloud security. More particularly, the present disclosure relates to systems and methods for cloud-centric biometric step-up and authentication.

BACKGROUND OF THE DISCLOSURE

User authentication and/or Multi-factor Authentication (MFA) is typically based on passwords, security questions, Short Message Service (SMS) One-time Password (OTP), phone call OTPs, push to app/app OTP, and Fast Identity Online (FIDO). All of these methods check whether a user attempting to access a service either knows something or has something, i.e., knows the answer to a security question or has an OTP. Further, all of these methods introduce various security risks including phishing, device vulnerability, device theft, application vulnerability, Internet Service Provider (ISP) vulnerability, etc. Recently, in order to enhance security, systems have implemented the use of biometric authentication based on user devices having biometric capabilities. These implementations are utilized to validate a user based on who they are rather than identifying something the user knows or has. Although, because these biometric methods are device-centric, they do not achieve the goal of identifying a person based on who they are, rather, they fall back on validation based on what the person has, i.e., the device. That is, even if a device identifies the person based on biometric features, such as facial recognition, fingerprint sensor, or retina scan, it does not signal this biometric information to the application. Instead, it simply confirms that an authorized user passed biometric authentication through implicit trust of the device. The present systems and methods introduce a cloud-centric biometric step-up and authentication process to overcome the challenges faced by the previously described methods.

BRIEF SUMMARY OF THE DISCLOSURE

The present disclosure relates to systems and methods for cloud-centric biometric step-up and authentication. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include monitoring traffic from one or more endpoints via a cloud service; determining a requirement for authentication of a user associated with the traffic based on the monitoring; causing a computing device associated with the user and the traffic to capture a photograph of the user; and processing the photograph to confirm an identity of the user.

The steps can further include wherein the processing is performed by the cloud service. The steps can further include receiving the photograph from the computing device at the cloud service; and processing the photograph by matching a face within the photograph against prerecorded biometric data of users stored in the cloud service. The steps can further include causing encryption of the photograph prior to receiving the photograph from the computing device. The prerecorded biometric data of users can be stored as encrypted templates, wherein the matching includes matching the encrypted photograph against the encrypted templates without reconstructing the photograph. Determining a requirement for authentication can be based on determining the user attempting to access any of a secure application and sensitive data. Determining a requirement for authentication can be based on identifying a high risk associated with the user. The steps can further include validating the authenticity of the photograph prior to the processing, wherein the validating is performed via an application executing on the computing device in combination with a cloud service. The validating can include any of validating software of the computing device, validating an actual camera of the computing device is used to capture the photograph, and confirming that the photograph is an actual live photograph of a real person. The steps can further include performing one of allowing or blocking access to one or more services based on the processing.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for cloud-centric biometric step-up and authentication. In various embodiments, to confirm the identity of a user, the user can be prompted to take a photograph of themselves via an application executing on their computing device. Responsive to the photograph being taken, the application can be adapted to send the photograph file to a cloud service. The photograph can then be matched against pre-recorded templates to confirm the user's identity. Again, the present systems and methods introduce a cloud-centric biometric step-up and authentication process to overcome the challenges faced by biometric authentication methods which rely on device-centric biometric systems.

§ 1.0 CYBERSECURITY MONITORING AND PROTECTION EXAMPLES

Figure 1A:
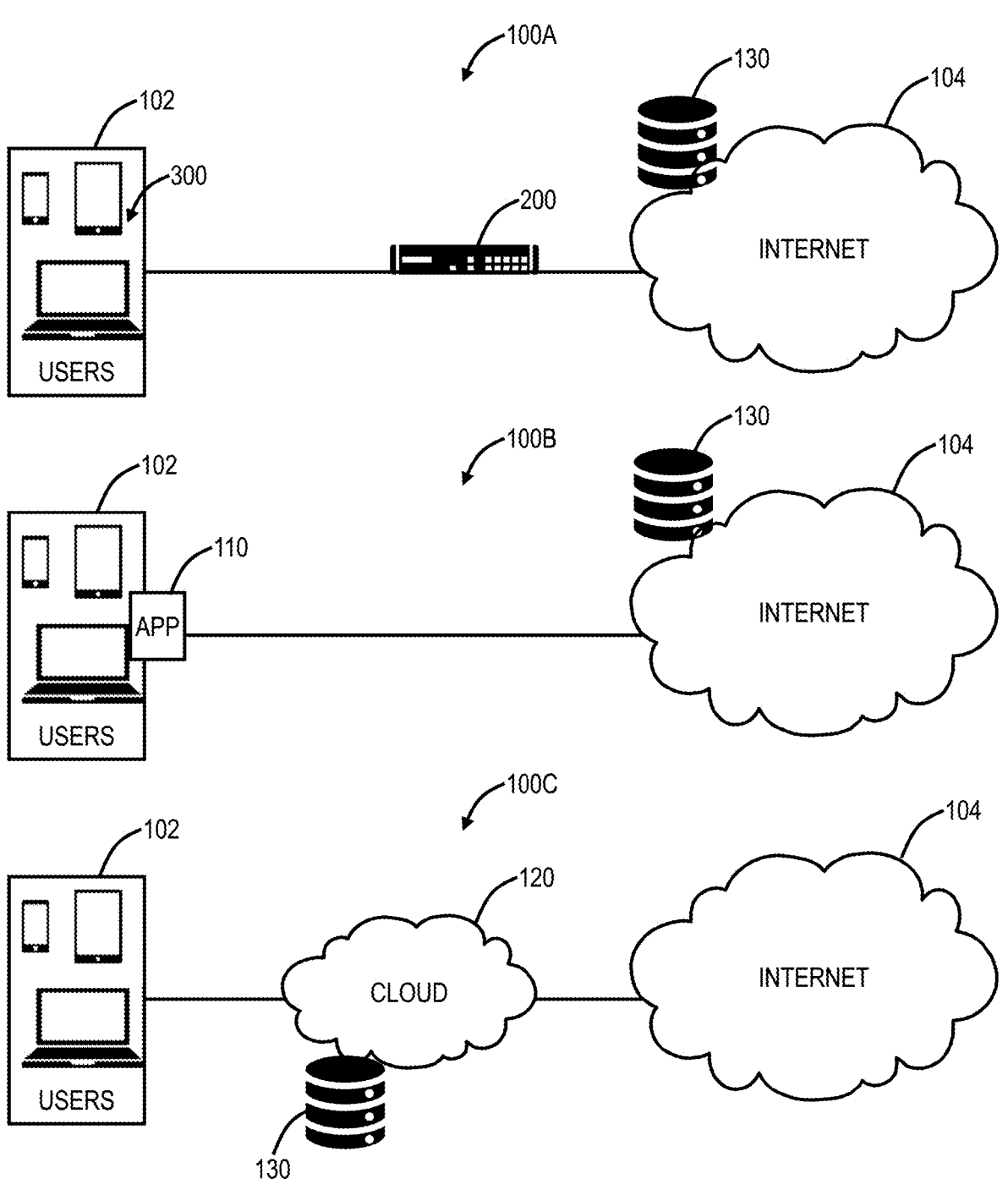
FIG. 1A is a network diagram of three example network configurations of cybersecurity monitoring and protection of a user.
Figure 2:
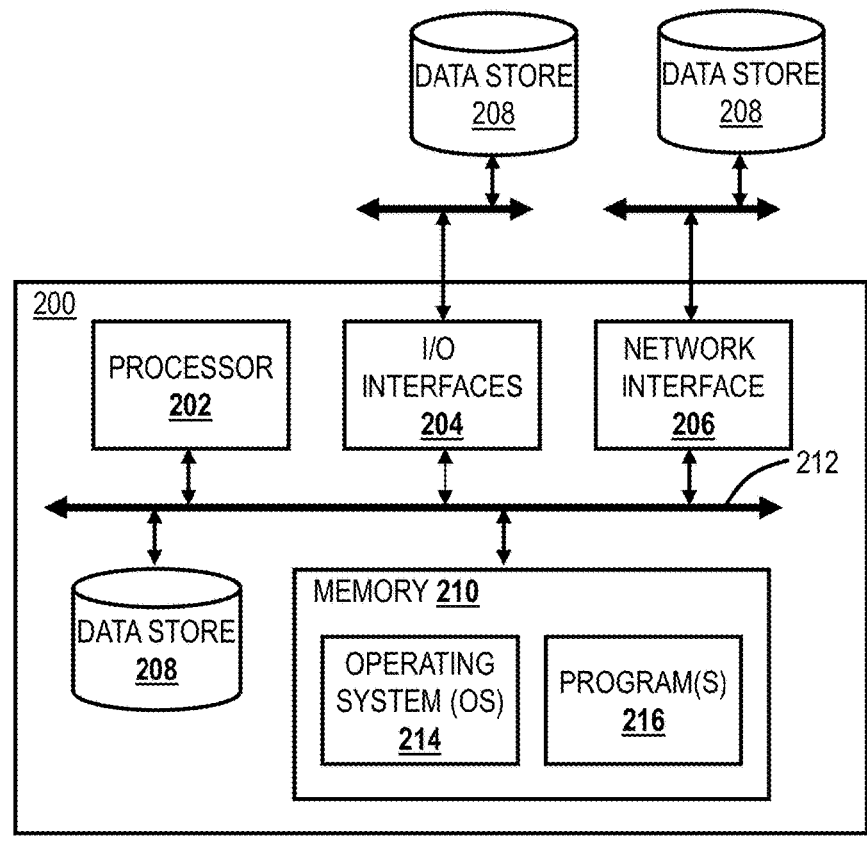
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
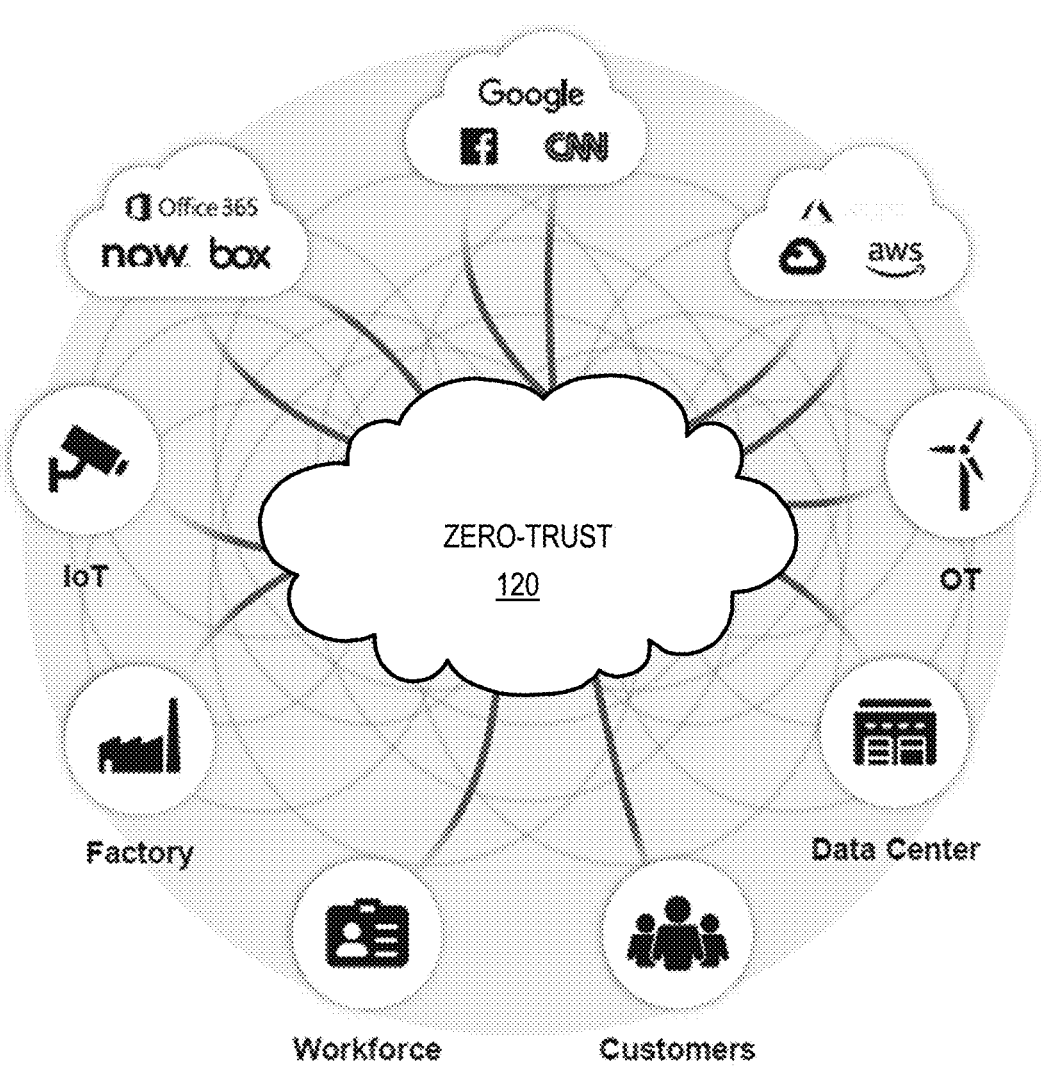
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a endpoint's 102 activity. That is, the log data 130 is not merely confined to specific activity (e.g., an endpoint's 102 social networking activity on a specific site, an endpoint's 102 search requests on a specific search engine, etc.), that is, when the endpoint 102 is a user.

§ 2.0 EXAMPLE SERVER ARCHITECTURE

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 EXAMPLE COMPUTING DEVICE ARCHITECTURE

Figure 3:
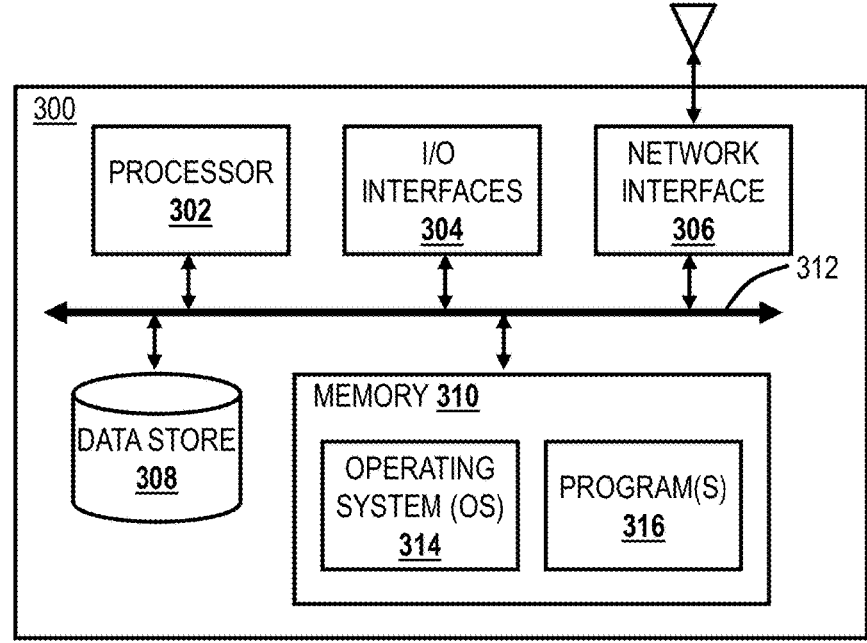
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

§ 4.0 APPLICATION FOR TRAFFIC FORWARDING AND MONITORING

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
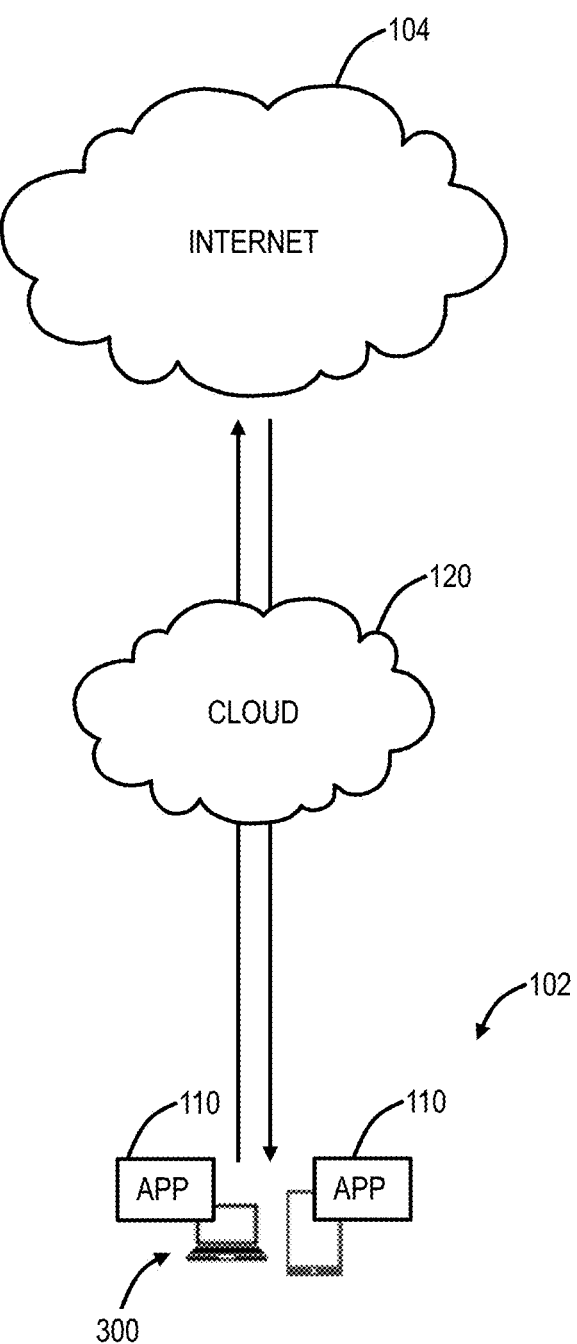
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if an endpoint 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the endpoints 102 based on fingerprinting the computing device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the computing device 300, when a user is the endpoint 102 utilizing the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user setup.

§ 5.0 CLOUD-CENTRIC BIOMETRIC STEP-UP AND AUTHENTICATION

The present disclosure relates to systems and methods for providing biometric step-up and authentication. Currently, enterprise user authentication and/or Multi-factor Authentication (MFA) is based on factors including password/security questions, Short Message Service (SMS) One-time Password (OTP)/phone calls, push to app/app OTP, and Fast Identity Online (FIDO). All of these methods check whether a user utilizing the device through witch they are accessing the service knows something or has something. For example knows the answer to a security question or has an OTP. Further, all of these methods introduce various security risks including phishing, device vulnerability, device theft, application vulnerability, Internet Service Provider (ISP) vulnerability, etc.

Software providers are now utilizing emerging biometric technologies found on most devices today. Even when utilizing emerging technologies such as face recognition and fingerprint readers at the device level, the trust perimeter is still only at the device level. Because of this, organizations have no control over the actual person enrolled on the device, and there is often an option to fall back on a pin code. Further, application or device compromise will often override biometric authentication. Because these biometric authentication features are features of the devices themselves, they cannot be transferred from one device to another, and require re-enrollment for each device.

More specifically, by utilizing device-based biometric technologies, an identity of a user is authenticated based on the device confirming and articulating that the user is who they say they are. For example, these device-based biometric technologies typically allow multiple users to enroll on a single device. That is, a plurality of users can utilize face recognition to authenticate to a single device. This is an issue when the device is attempting to access a service where the identity of the user must be authenticated. If any of these biometric device technologies are utilized, the issue arises because the device will articulate that the user is authenticated even if the user is any of the enrolled users of the device, and not the specific user to whom the access is granted for. Because of this, any user that is enrolled with the device via any of the biometric methods will be improperly authenticated.

Figure 5:
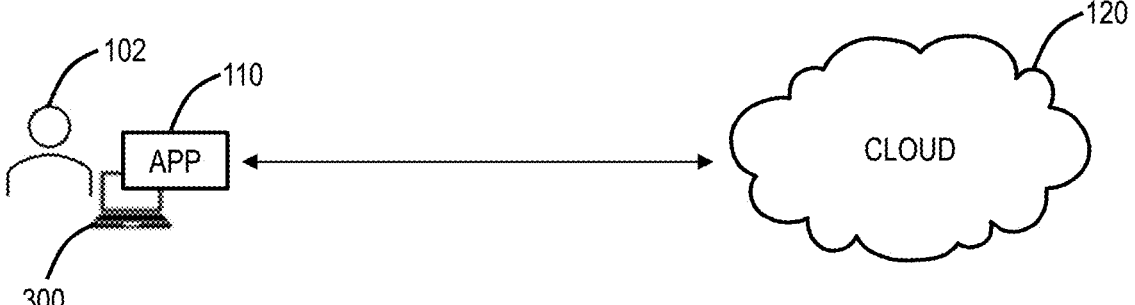
FIG. 5 is a network diagram of a user authenticating to the cloud for utilizing one or more services.

To solve such issues, the present disclosure provides a cloud-centric biometric step-up and authentication process. In various embodiments, the present processes contemplate usage of the application 110 in coordination with the cloud 120. FIG. 5 is a network diagram of a user 106 authenticating to the cloud 120 for utilizing one or more services. To confirm the identity of the user 106, the user is prompted to take a photograph of themselves (selfie). The selfie is then matched against pre-recorded templates to confirm the user's identity through a face within the photograph. The application 110 can be adapted to ensure that the computing device 300 that the user 106 is using is not tampered with. For example, the application 110 can ensure that a real camera of the computing device 300 is being used for the photograph without any software filters. Additionally, the cloud service performs a liveness check. That is, it ensures that the photograph taken is a real live image and not a photograph of a picture or a screen. This process can be combined with any existing Identity Provider (IDP) already in use, for example as a step-up authentication, thereby the IDP does not need to be replaced. It will be appreciated that the user 106 can be contemplated as an endpoint 102, where the cloud 120 is adapted to monitor traffic to and from the user 106 utilizing a computing device 300 as described herein.

In various embodiments, when the user 106 is attempting to access a secure service, the user 106 can be prompted to, utilizing a camera of the computing device 300, to take a photograph of themselves (selfie). This photograph is then sent to the cloud 120. The cloud 120 is then adapted to validate the identity of the user 106 based on the provided photograph. Again, this validation can be based on matching the received photograph to one or more pre-recorded photographs of the user 106 stored in the cloud 120. In various embodiments, the matching can be based on facial recognition Artificial Intelligence (AI) models, and the like.

In various embodiments, the computing device 300 which the user 106 is utilizing will be preconfigured with the application 110. Thus, the software of the computing device 300 can be validated by the application 110 to verify that the computing device 300 is not compromised, i.e., jail broken or rooted. Further, the application 110 can be adapted to confirm that the computing device 300 is not tampered with, i.e., confirm that there are no deep fake attempts, no attempts at utilizing a virtual camera that would replace the identity, etc. Even further, the application 110 and/or the cloud 120 can utilize one or more additional systems for validating the authenticity of the photograph. For example, the systems can utilize neural networks to confirm that the photograph is an actual live photograph and not a picture of a picture that has been taken by an attacker. Such additional systems can implement passive liveness checks to determine whether the face presented on a photo is a real person, without requiring the user to perform any additional challenge. These methods of validating the legitimacy of the photograph can be performed at the application 110 prior to sending the photograph to the cloud 120, and/or in combination with the application 110 and the cloud 120.

Again, these processes can be combined with the use of an IDP and can be used as a step-up authentication factor rather than replacing an existing IDP of a customer/enterprise. Utilizing the present systems for a step-up authentication can be in response to, based on monitoring of traffic, a user attempting to access a highly secure application, highly sensitive data, etc. which would require the identification of the user to be confirmed.

Additionally, based on privacy practices and configurations of the various customers/enterprises which utilize the cloud 120, the present systems and methods can implement encryption of the photographs being sent to the cloud 120. That is, the application 110 can encrypt the photograph prior to forwarding the photograph to the cloud 120. Similarly, the stored photograph templated within the cloud 120 can be encrypted to protect identities of users. That is, the prerecorded photographs of users can be stored as encrypted templates, wherein the matching includes matching the encrypted photograph against the encrypted templates without reconstructing the photograph. Further, responsive to the authentication procedures being completed, the photograph can be destroyed immediately afterward.

In an example use case, the present systems and methods can be implemented as follows. Responsive to a use authenticating via an existing IDP to the cloud 120, the cloud 120 and application 110 can monitor real-time inline traffic of the user. When it is identified that the user is attempting to access a sensitive system, service, data, etc., or if there is a high risk associated with the user, the present biometric step-up and authentication methods can be implemented to determine if access should be granted. In various cases, a user can be contemplated as having a high risk in response to the user accessing a system from an unusual location, attempting to access a system an unusual number of times, downloading too many files, etc. based on this, the present authentication processes can be implemented to confirm the identity of the user.

The present authentication processes can be implemented by sending a user a push notification on the computing device 300 which they are using. The notification can direct them to the application 110 which instructs them to take a photograph which is then sent to the cloud 120 for authentication. In some embodiments, the application 110 can provide an intuitive interface for the user to provide the photograph. For example, the application can be given access to the camera of the computing device and can take the photograph automatically via face recognition, tracking, etc.

Again, the present authentication processes, i.e., the processing of the captured photograph, is performed by the cloud 120, thereby avoiding any of the aforementioned issues associated with traditional device-based biometric authentication. Once the photograph file is sent to the cloud 120, the cloud 120 can perform the authenticating to make sure the user accessing the services is the actual user who is authorized to do so.

Prior to utilization of the present systems and methods, users of an enterprise can be enrolled by providing one or more photographs. The one or more photographs provided by users can then be stored within the cloud 120 (cloud service), in an encrypted template, for performing comparisons therewith. Again, the present systems and methods for cloud-centric biometric authentication can be implemented as a step-up authentication, as an additional factor, i.e., as part of MFA, or as a standalone authentication method.

§ 5.1 Process for Cloud-Centric Biometric Step-Up and Authentication

Figure 6:
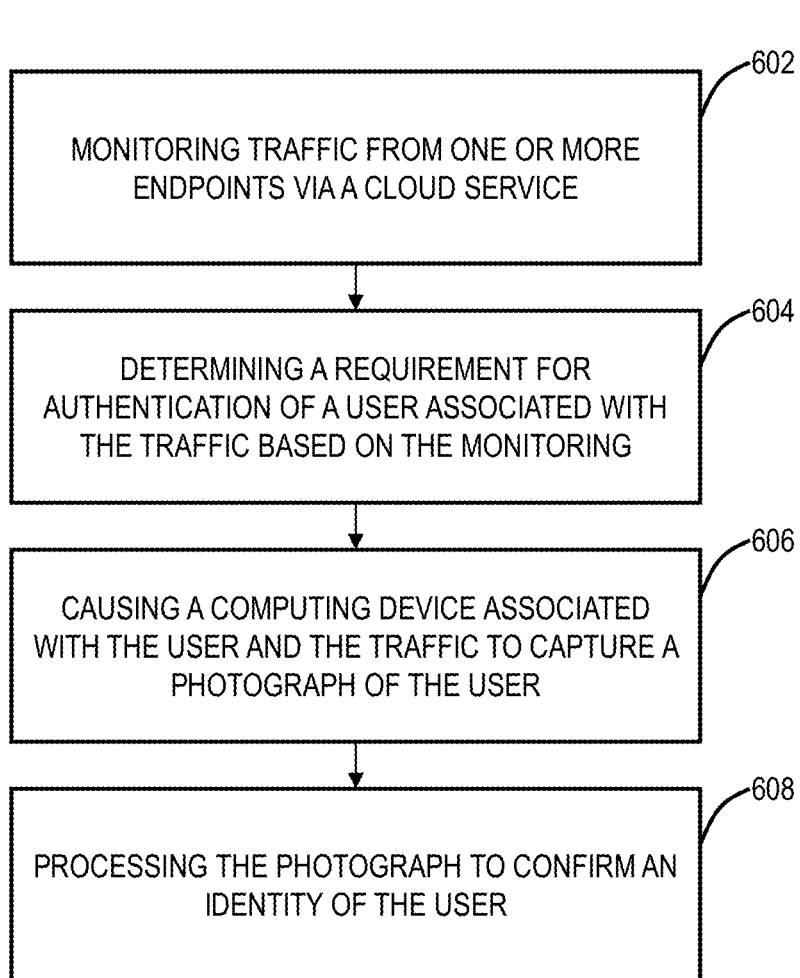
FIG. 6 is a flowchart of a process for cloud-centric biometric step-up and authentication.

FIG. 6 is a flowchart of a process 600 for cloud-centric biometric step-up and authentication. The process 600 includes monitoring traffic from one or more endpoints via a cloud service (step 602); determining a requirement for authentication of a user associated with the traffic based on the monitoring (step 604); causing a computing device associated with the user and the traffic to capture a photograph of the user (step 606); and processing the photograph to confirm an identity of the user (step 608).

The process 600 can further include wherein the processing is performed by the cloud service. The steps can further include receiving the photograph from the computing device at the cloud service; and processing the photograph by matching the photograph against prerecorded photographs of users stored in the cloud service. The steps can further include causing encryption of the photograph prior to receiving the photograph from the computing device. The prerecorded photographs of users can be stored as encrypted templates, wherein the matching includes matching the encrypted photograph against the encrypted templates without reconstructing the photograph. Determining a requirement for authentication can be based on determining the user attempting to access any of a secure application and sensitive data. Determining a requirement for authentication can be based on identifying a high risk associated with the user. The steps can further include validating the authenticity of the photograph prior to the processing, wherein the validating is performed via an application executing on the computing device. The validating can include any of validating software of the computing device, validating an actual camera of the computing device is used to capture the photograph, and confirming that the photograph is an actual live photograph. The steps can further include performing one of allowing or blocking access to one or more services based on the processing.

§ 6.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method comprising steps of:
monitoring traffic from one or more endpoints via a cloud service;
determining a requirement for authentication of a user associated with the traffic based on the monitoring;
causing a computing device associated with the user and the traffic to capture a photograph of the user;
performing a validation check of the photograph by confirming the photograph is a live image captured by an actual camera of the computing device and not modified by software filters, prior to processing; and
processing the photograph to confirm an identity of the user by matching the photograph against prerecorded encrypted templates stored by the cloud service, wherein the matching is performed without reconstructing the photograph.

2. The method of claim 1, wherein the processing is performed by the cloud service after receiving the photograph from the computing device.

3. The method of claim 2, wherein the steps comprise:
receiving the photograph from the computing device at the cloud service; and
processing the photograph by matching the photograph against prerecorded photographs of users stored in the cloud service, wherein the matching utilizes facial recognition Artificial Intelligence (AI) models.

4. The method of claim 3, wherein the steps comprise:
causing encryption of the photograph at the computing device by an application executing thereon prior to receiving the photograph from the computing device.

5. The method of claim 4, wherein the prerecorded photographs of users are stored as encrypted templates, and wherein the matching includes matching the encrypted photograph against the encrypted templates without reconstructing the photograph, and wherein the photograph is destroyed immediately after processing by the cloud service.

6. The method of claim 1, wherein determining a requirement for authentication is based on determining the user attempting to access any of a secure application and sensitive data, responsive to inline real-time monitoring of the traffic by the cloud service.

7. The method of claim 1, wherein determining a requirement for authentication is based on identifying a high risk associated with the user, wherein the high risk is identified based on unusual access patterns detected by the cloud service, including at least one of accessing from an unusual location, repeated access attempts, or downloading a threshold number of files.

8. The method of claim 1, wherein the steps comprise:
validating the authenticity of the photograph prior to the processing, wherein the validating is performed via an application executing on the computing device by confirming that the computing device is not compromised, jailbroken, or rooted.

9. The method of claim 8, wherein the validating includes any of validating software of the computing device, validating an actual camera of the computing device is used to capture the photograph, and confirming that the photograph is an actual live photograph by performing passive liveness checks using neural networks.

10. The method of claim 1, wherein the steps further comprise:
performing one of allowing or blocking access to one or more services based on the processing, and wherein processing and validation steps are triggered via a push notification sent to the computing device by the cloud service.

11. A non-transitory computer-readable medium comprising instructions that, when executed, cause one or more processors to perform steps of:
monitoring traffic from one or more endpoints via a cloud service;
determining a requirement for authentication of a user associated with the traffic based on the monitoring;
causing a computing device associated with the user and the traffic to capture a photograph of the user;
performing a validation check of the photograph by confirming the photograph is a live image captured by an actual camera of the computing device and not modified by software filters, prior to processing; and
processing the photograph to confirm an identity of the user by matching the photograph against prerecorded encrypted templates stored by the cloud service, wherein the matching is performed without reconstructing the photograph.

12. The non-transitory computer-readable medium of claim 11, wherein the processing is performed by the cloud service after receiving the photograph from the computing device.

13. The non-transitory computer-readable medium of claim 12, wherein the steps comprise:

receiving the photograph from the computing device at the cloud service; and processing the photograph by matching the photograph against prerecorded photographs of users stored in the cloud service, wherein the matching utilizes facial recognition Artificial Intelligence (AI) models.

14. The non-transitory computer-readable medium of claim 13, wherein the steps comprise:

causing encryption of the photograph at the computing device by an application executing thereon prior to receiving the photograph from the computing device.

15. The non-transitory computer-readable medium of claim 14, wherein the prerecorded photographs of users are stored as encrypted templates, and wherein the matching includes matching the encrypted photograph against the encrypted templates without reconstructing the photograph, and wherein the photograph is destroyed immediately after processing by the cloud service.

16. The non-transitory computer-readable medium of claim 11, wherein determining a requirement for authentication is based on determining the user attempting to access any of a secure application and sensitive data responsive to inline real-time monitoring of the traffic by the cloud service.

17. The non-transitory computer-readable medium of claim 11, wherein determining a requirement for authentication is based on identifying a high risk associated with the user, wherein the high risk is identified based on unusual access patterns detected by the cloud service, including at least one of accessing from an unusual location, repeated access attempts, or downloading a threshold number of files.

18. The non-transitory computer-readable medium of claim 11, wherein the steps comprise:

validating the authenticity of the photograph prior to the processing, wherein the validating is performed via an application executing on the computing device by confirming that the computing device is not compromised, jailbroken, or rooted.

19. The non-transitory computer-readable medium of claim 18, wherein the validating includes any of validating software of the computing device, validating an actual camera of the computing device is used to capture the photograph, and confirming that the photograph is an actual live photograph by performing passive liveness checks using neural networks.

20. The non-transitory computer-readable medium of claim 11, wherein the steps further comprise:

performing one of allowing or blocking access to one or more services based on the processing, and wherein processing and validation steps are triggered via a push notification sent to the computing device by the cloud service.

\* \* \* \* \*